US006899057B1

(12) United States Patent
Chrisco et al.

(10) Patent No.: US 6,899,057 B1
(45) Date of Patent: May 31, 2005

(54) POP-UP PET CARRIER

(75) Inventors: Larry L. Chrisco, Fairland, OK (US); Orval Lee Fick, Miami, OK (US)

(73) Assignee: Blitz, U.S.A., Inc., Miami, OK (US)

( * ) Notice: Subject to any disclaimer, the term of this patent is extended or adjusted under 35 U.S.C. 154(b) by 0 days.

(21) Appl. No.: 10/708,151

(22) Filed: Feb. 11, 2004

(51) Int. Cl.[7] .......................... A01K 1/03; E04H 15/40; E04H 15/44
(52) U.S. Cl. ...................... 119/498; 135/125; 135/126
(58) Field of Search ............................... 119/496–498; 135/125, 126, 128; D30/108, 109; 190/107; D21/589; 40/124.08; 220/666

(56) References Cited

U.S. PATENT DOCUMENTS

| 2,170,379 | A | | 8/1939 | Orit |
|---|---|---|---|---|
| 3,156,213 | A | | 11/1964 | Patten |
| 3,481,311 | A | | 12/1969 | Schluttig |
| 3,960,161 | A | * | 6/1976 | Norman ...................... 135/126 |
| 4,803,951 | A | | 2/1989 | Davis |
| 4,895,230 | A | * | 1/1990 | King ........................... 190/107 |
| 5,078,096 | A | * | 1/1992 | Bishop et al. ............... 119/497 |
| 5,170,745 | A | | 12/1992 | Burdette, Jr. |
| 5,277,148 | A | | 1/1994 | Rossignol et al. |
| 5,351,646 | A | | 10/1994 | Zoroufy |
| 5,601,105 | A | * | 2/1997 | Blen et al. ................... 135/126 |
| D387,508 | S | | 12/1997 | Van Engers |
| 6,021,740 | A | | 2/2000 | Martz |
| 6,076,485 | A | | 6/2000 | Peeples et al. |
| 6,286,461 | B1 | | 9/2001 | Martz |
| 6,311,709 | B1 | * | 11/2001 | Louie et al. ................. 135/125 |
| 6,363,955 | B1 | * | 4/2002 | Louie ........................... 135/126 |
| 6,446,577 | B1 | | 9/2002 | Salahor |
| D469,929 | S | * | 2/2003 | Licciardello ............... D30/109 |
| 6,715,446 | B2 | * | 4/2004 | Chou .......................... 119/497 |

OTHER PUBLICATIONS

U.S. Appl. Pub. No. 2003/0127060 A1 to Yeung, entitled Compressible Pet Carrier, Pub. Date Jul. 10, 2003.
Internet website printout from www.ameristep.com disclosing prior art pop-up hunting bird (printed Sep. 5, 2003).
Internet website printout from www.sportsmanguide.com disclosing proir art pop-up hunting blind (printed Sep. 5, 2003).

* cited by examiner

Primary Examiner—Teri Pham Luu
Assistant Examiner—Bret Hayes
(74) Attorney, Agent, or Firm—Hovey Williams LLP

(57) ABSTRACT

A collapsible pet carrier (10) includes a base (12) with a shiftable frame (14) movable between a collapsed position and an extended use position; the carrier also has a flexible cover (16) which, with the base, forms a pet enclosure. The cover (16) has an animal doorway (66) as well as optional see-through windows (74). The frame (14) is preferably formed of flexible and resilient shape memory material allowing the frame to self-erect when unrestrained, without any manual manipulation or other intervention. Also, the carrier (10) preferably includes a top (18) which mates with the base to form a carrier housing, which restrains the popup frame (14) to retain it within the carrier housing. The top (18) may also be inverted and secured to the base (12) during use.

52 Claims, 6 Drawing Sheets

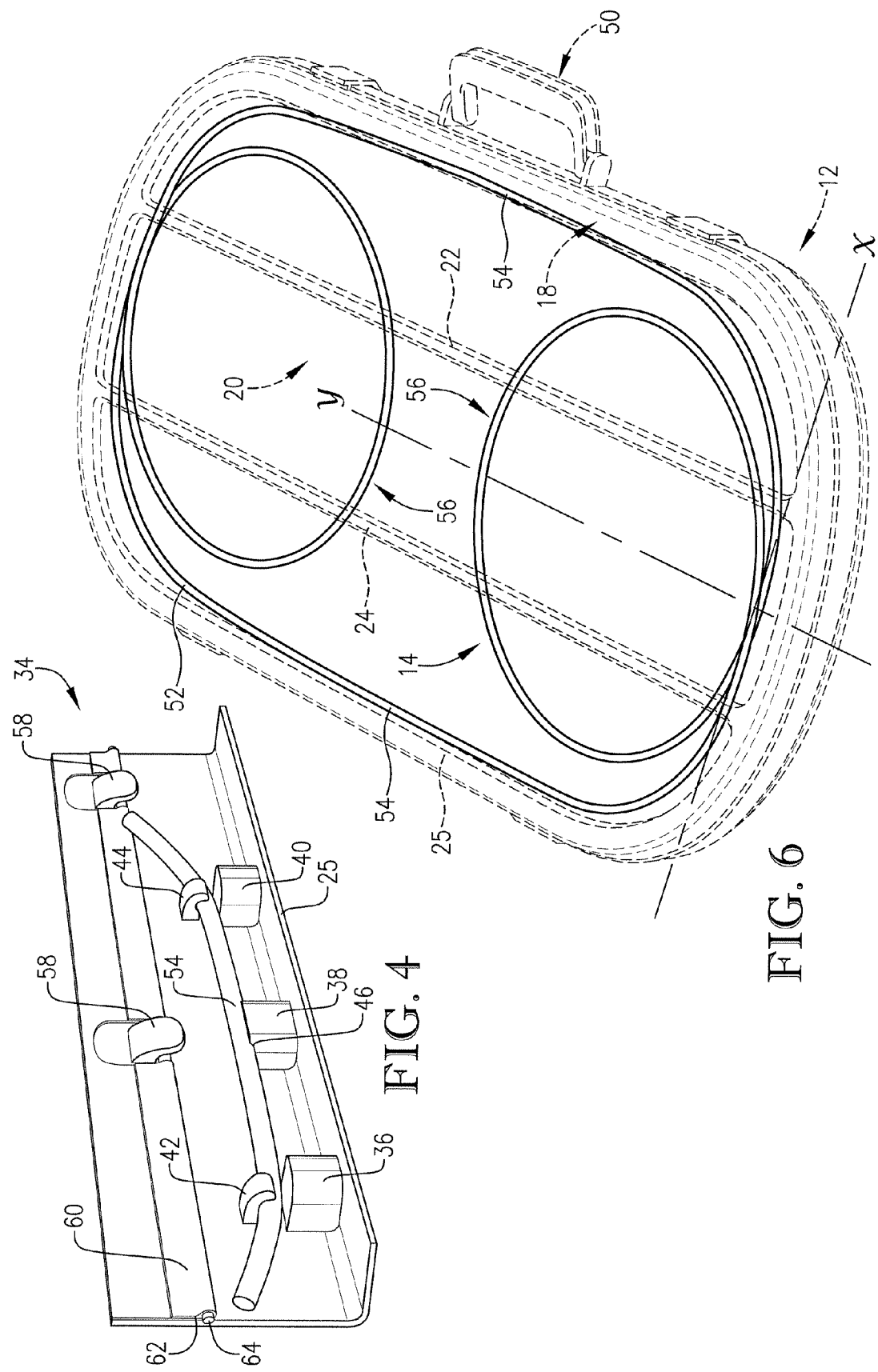

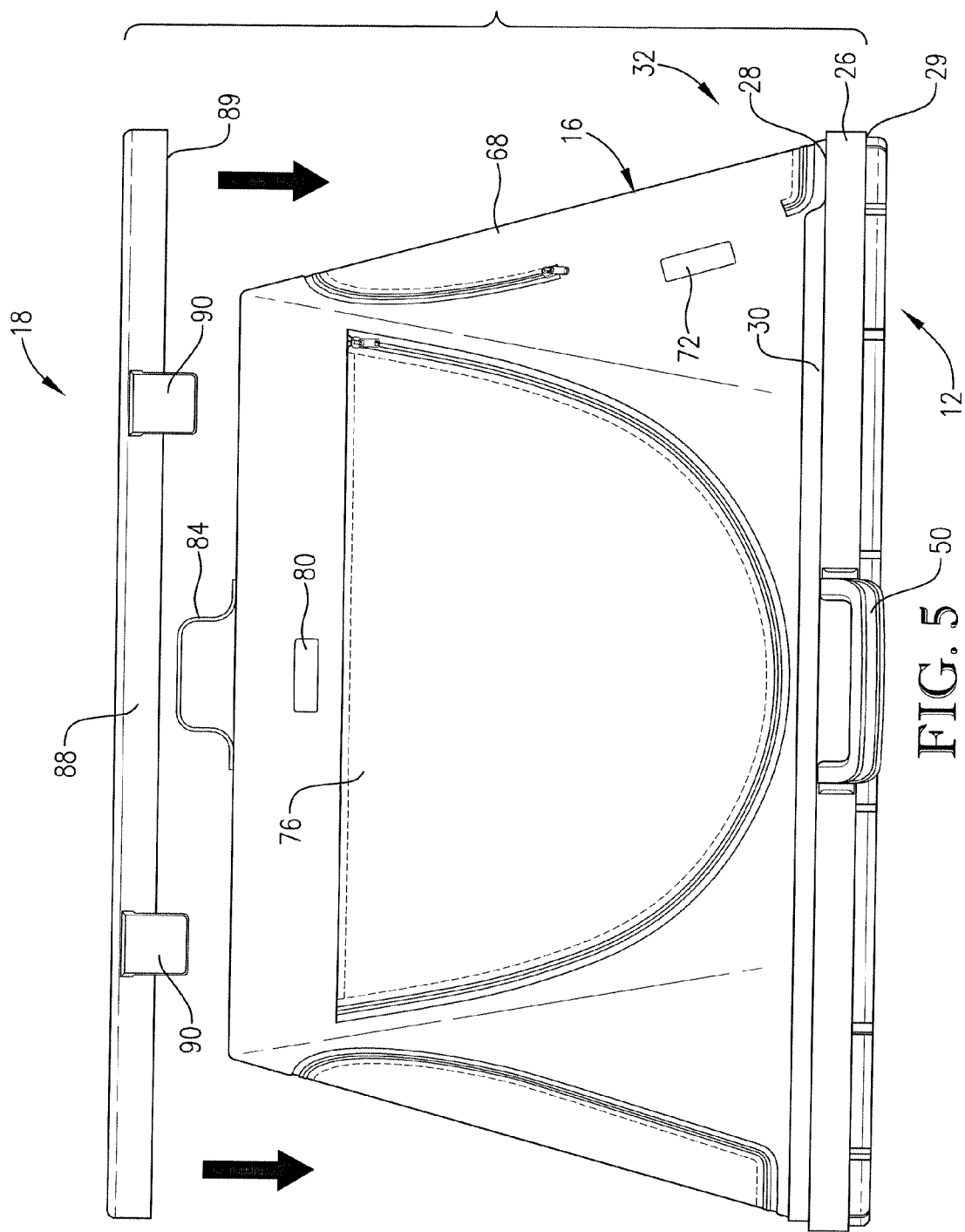

POP-UP PET CARRIER

BACKGROUND OF INVENTION

1. Field of the Invention

The present invention is broadly concerned with collapsible pet carriers for domesticated pets such as cats and dogs, whereby a pet owner may transport the carrier in a convenient collapsed condition, but can readily extend the carrier as needed in order to provide a temporary shelter and carrier for a pet. More particularly, the invention is concerned with such pet carriers preferably including a substantially rigid base with an attached pop-up frame and flexible cover, and wherein the frame is capable of pop-up self-erection to its extended use position when the frame is unrestrained without any manual manipulation or other intervention, because of the resilience, flexibility and shape memory characteristics of the frame material. An additional preferred aspect of the invention involves use of a top which mates with the base to form a carrier housing which restrains the frame in its collapsed condition; moreover, during use of the carrier the top may be attached to the base.

2. Description of the Prior Art

Pet owners have traditionally relied upon rigid cages to contain pets while traveling. Such cages are often heavy, bulky and difficult to move, and thus are inconvenient for modern-day travelers.

Many attempts have been made in the past to provide more convenient and collapsible pet carriers which avoid the problems of standard cage-type carriers. However, these prior devices are often characterized by difficulty in use, i.e., significant time or effort is required to set up a carrier for use from a collapsed storage position. For example, U.S. Pat. No. 5,277,148 describes a wearable pet enclosure having a base adapted to fit against the body with a collapsible frame and cover. In this instance, the frame is made up of separate flexible frame pieces each connected in a hoop-like fashion to the base. In order to extend the frame for use, it is necessary to first pull each frame piece upwardly and then disconnect an end of each piece which is then reconnected to an opposing coupler. As such, it is necessary to remove the cover in such a carrier in order to access the frame.

Other representative prior art pet carriers are disclosed in U.S. Pat. Nos. 6,286,461, 6,021,740, 5,170,745, 4,803,951, 6,446,577, 5,351,646, 6,076,485, 3,156,213, 2,170,379, 3,481,311, D387,508, and Published Application U.S. 2003/0127060.

SUMMARY OF INVENTION

The present invention overcomes the problems outlined above, and provides a greatly improved collapsible pet carrier. Broadly speaking, a pet carrier in accordance with the invention includes a base having a frame secured thereto and shiftable between a collapsed position proximal to the base and an extended use position. A flexible cover also forms a part of the carrier and is adapted to be disposed over the frame in the extended use position thereof. The frame preferably presents a pair of arcuate sections in both the collapsed and extended frame positions, and the frame is capable of movement from the collapsed to the extended position of its own accord and without any intervention or manual manipulation of the frame, once the frame is unrestrained. During such popup self-erection of the frame, the arcuate sections twist and pivot about transverse axes. The frame is preferably formed of a material having the resilience, flexibility and shape memory characteristics required for such pop-up self-erection, and is advantageously in the form of an endless, unitary length of such material.

In another aspect of the invention, the overall carrier includes a top which mates with the base when the carrier frame is collapsed in order to cooperatively define a restraining housing for the frame and cover. In this orientation, the carrier presents a narrow profile and can be readily carried. When the carrier is to be used, the top is detached from the base, allowing the frame and cover to self-erect, and the top is inverted. The top is configured to mate with the base in the inverted condition, so that the combined structure creates a rigid bottom for the carrier and avoids possible loss of the top.

BRIEF DESCRIPTION OF DRAWINGS

FIG. 4 is a fragmentary isometric view illustrating a preferred connection between the pop-up frame and the base, and also the connection between the base and the flexible cover of the carrier;

FIG. 5 is an elevational view of the carrier in its extended use position, and illustrating the method of collapsing the frame by placing the top above the frame and cover, and pressing downwardly to reconnect the top to the base;

FIG. 6 is an isometric view illustrating the configuration of the frame in its collapsed and restrained position within the housing formed by the base and top, the latter being illustrated in phantom.

DETAILED DESCRIPTION

Figure 1:
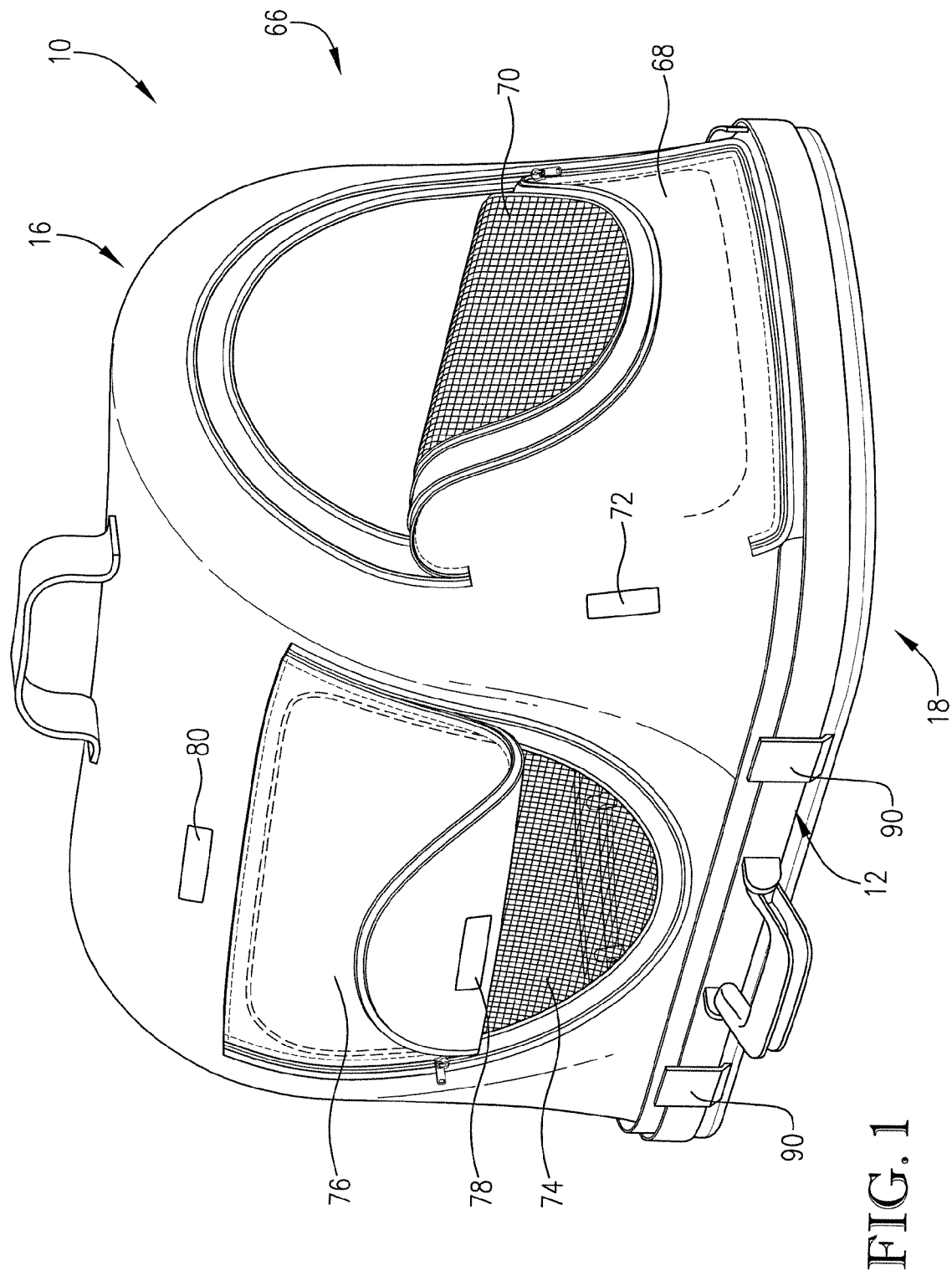
FIG. 1 is an isometric view of a pop-up pet carrier in accordance with the invention, illustrated in its extended use configuration and with the access door of the carrier partially opened.

Turning now to the drawings, a pop-up pet carrier 10 in accordance with the invention broadly includes a base 12, a frame 14 (see FIG. 3) disposed within and operatively connected to the base 12, a flexible cover 16, and a top 18. The carrier 10 is designed, in its extended use position illustrated in FIGS. 1–3, to house a pet such as a cat or dog for transport. A feature of the invention is that the carrier may be closed within a housing defined by the base 12 and top 18 for easy transport, and then may be rapidly and easily opened and extended for use as a pet carrier.

Figure 3:
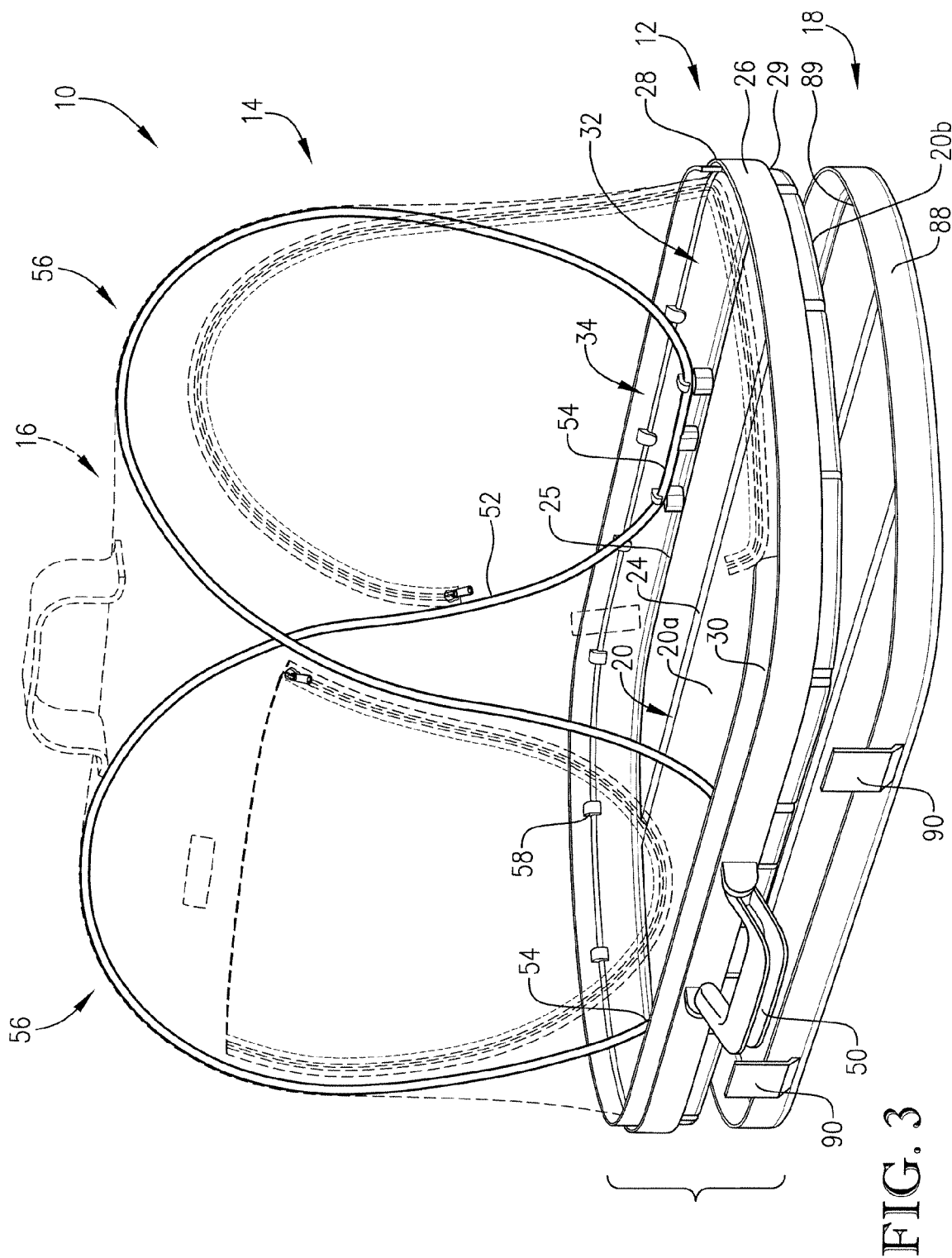
FIG. 3 is an exploded view illustrating the base of the carrier with the frame extended and prior to connection of the carrier top to the underside of the base.

In more detail, the base 12 includes a main panel 20 having arcuate ends and a pair of spaced apart, lengthwise reinforcing ribs 22, 24 and a peripheral rib 25. The ribs define troughs within the inside of the base to collect animal fluids during use. The panel 20 has an inner surface 20a and a corresponding underside 20b. The base 12 also presents a continuous upstanding sidewall 26 presenting an upper margin 28; the wall 26 is slightly offset relative to panel 20 so as to present a lower lip edge 29. As best seen in FIG. 3, the base 12 is provided with an additional, somewhat L-shaped upstanding inner wall 30 which extends about the majority of the sidewall 26, except at the pet entryway region 32.

The inner wall 30 supports two frame connector sets 34 (see FIG. 4) disposed on opposite sides of the base 12 generally midway along the length thereof. Each frame connector set 34 includes three upstanding, spaced apart blocks 36, 38, and 40, as well as a pair of downturned catches 42, 44 respectively located above a corresponding block 36 and 40. It will be observed that the central block 38 of each set has a concave upper surface 46 so as to accommodate frame 12 as will be explained. The blocks 36–38 are supported on the inturned flange 48 (which corresponds with rib 25) of the inner wall 30 as shown.

The base 12 is preferably formed of a substantially rigid synthetic resin material such as polyethylene, polypropylene or vinyl chloride. Of course, a variety of other materials can be used in the fabrication of base 12. Also, a handle 50 may be attached to base 12 as shown.

The frame 14 is designed so that it may assume two different positions, namely a collapsed position proximal to and preferably within the confines of base 12, and an expanded or extended use position. Moreover, it is preferred that the frame 14 be a pop-up frame, i.e., once the frame is unrestrained it will pop-up or self-erect from the collapsed to the extended position thereof without any manual manipulation or other intervention.

To this end, the frame 14 is preferably formed from a unitary, endless segment 52 of resilient, flexible, twistable material having shape memory, such as chrome-silicon music wire, or an appropriate synthetic resin material. In more detail, the preferred segment 52 includes a pair of opposed connection stretches 54 each coupled to a corresponding connection set 34, as well as a pair of arcuate sections 56 between the stretches 54, with the sections 56 essentially forming the upper end of the carrier 10 when in its extended use position. Referring specifically to FIGS. 3 and 6, the two alternate positions of the frame 14 are illustrated. First considering FIG. 6, it will be seen that the arcuate sections 56 are each inboard of the opposed ends of the base 12, in direct opposition to each other. Of course, the stretches 54 (FIG. 4) remain connected to the base 12 as explained previously. During self-erection of the frame and cover, the frame undergoes pivoting of each section 56 about transverse axes until each section is fully erected. As shown in FIG. 6, idealized X and Y axes are shown as indicative of the transverse axes about which the sections 56 pivot. It will be appreciated that in practice the axes need not be orthogonal nor intersecting; rather, the twisting and pivoting of the sections need occur only in a manner to obtain the desired self-erection.

The cover 16 is preferably secured to the base 12 and remains affixed thereto when the carrier is collapsed or extended. In particular, it will be observed that the upstanding portion of inner wall 30 is equipped with a series of spaced apart, downturned connection clips 58. Moreover, a further series of these clips (not shown) is secured to wall 26 along the inner face thereof and at the region 32, so that the hold down clips 58 extend throughout the entire inner margin of the base 12. The bottom edge of the cover 16 is equipped with a hem 60 defining a continuous slot 62 (FIG. 4). A connection rod 64 is housed within the slot 62. At the region of the respective clips 58, the hem 60 is relieved, thereby exposing portions 64a of the rod. Thus, the clips 58 engage the corresponding portions 64 so as to retain the cover 16 in place and connected to the base 12.

Figure 2:
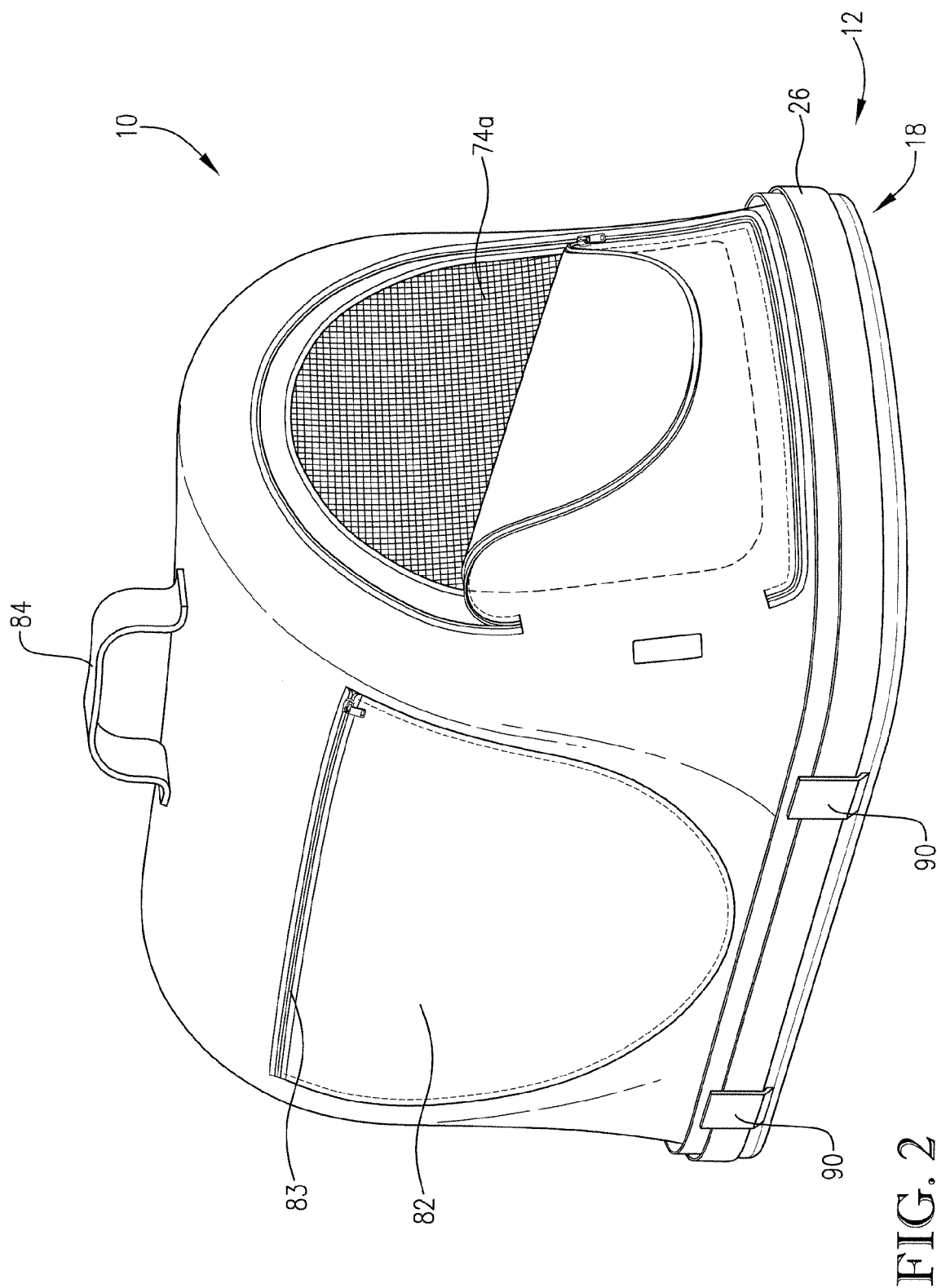
FIG. 2 is an isometric view of the carrier, depicting the side of the cover opposite that shown in FIG. 1.

The preferred cover 16 of FIG. 1 includes an access door 66 in the form of a zippered flap 68 which may be open as shown in FIG. 2. Additionally, an inner, see-through mesh flap 70 is also affixed to the main body of the cover. Hence, the access door 66 may be opened by unzipping both flaps 68 and 70, thereby allowing a pet to enter or leave the extended carrier 10. The flap 68 is provided with a Velcro hook and loop connection strip (not shown) which mates with a corresponding strip 72 so as to hold flap 68 open. In the FIG. 1 embodiment, one side of the cover 16 has a transparent mesh window 74 selectively covered by a non-transparent flap 76. In this instance the flap 76 is secured to the cover along the upper margin of the flap, and the inner face of the flap has a hook and loop connection strip 78 which mates with a corresponding strip 80 provided on cover 16. Thus, the flap 76 may be unzipped as shown in FIG. 1 and rolled up with interconnection between the strips 78 and 80 to maintain the flap in an opened condition.

FIG. 2 depicts the end of the cover opposite the access door, this end being provided with a removably covered window 74a similar to window 74. Further, the side depicted in FIG. 2 has a pocket 82 with a closure zipper 83. If desired, the top of cover 16 is equipped with a flexible carry handle 84 which may be sewn or otherwise affixed to the outer surface of the cover. This permits the carrier 10 to be easily transported, even with a pet confined within the carrier.

Figure 7:
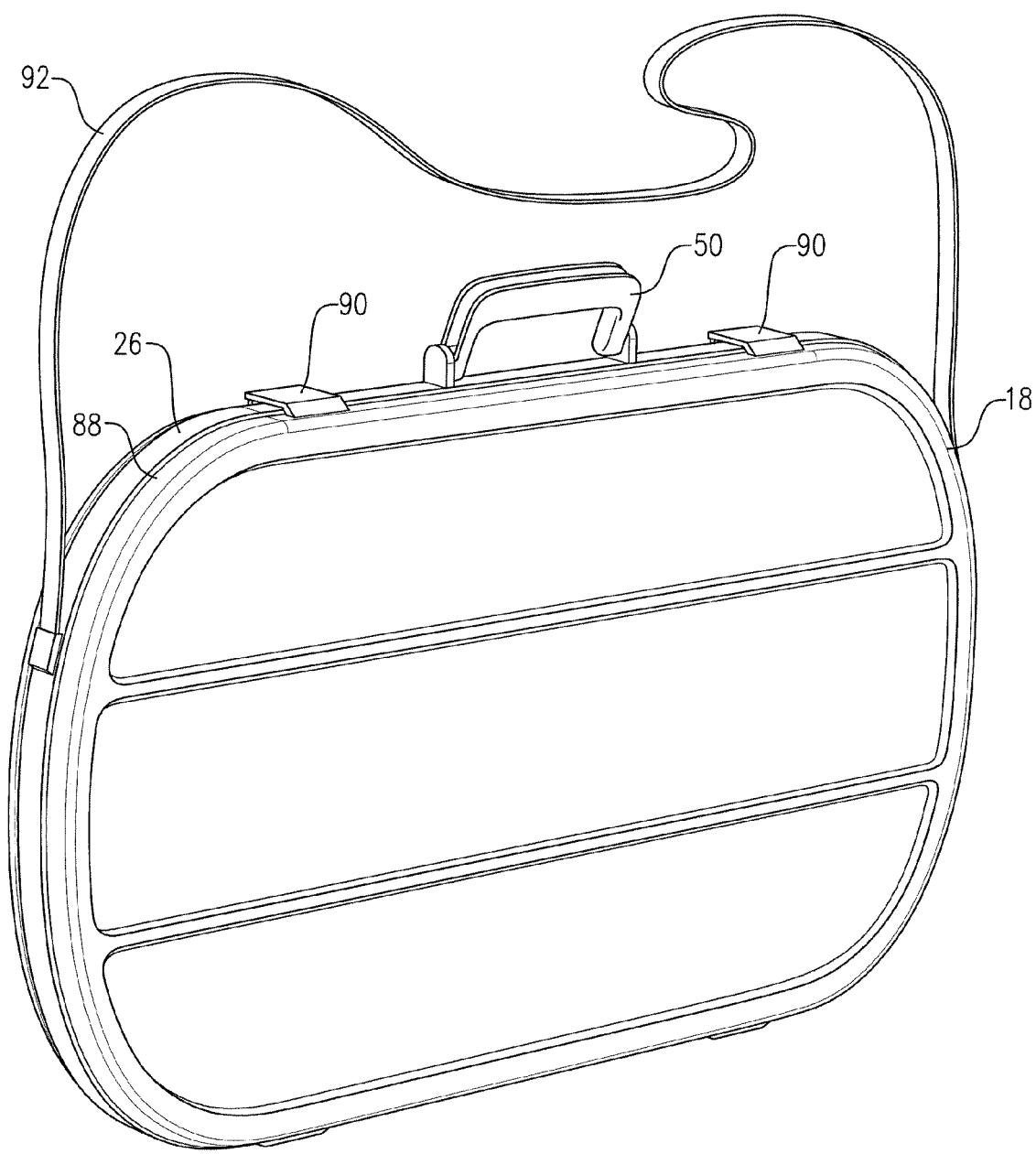
FIG. 7 is an isometric view of the carrier in its closed condition.

The overall carrier 10 preferably includes a substantially rigid top 18 which includes a ribbed main panel 86 with an upstanding marginal sidewall 88 presenting a terminal edge 89. The top 18, like base 12, is advantageously formed of any suitable synthetic resin material. The opposite sides of the sidewall 88 are equipped with a pair of spring latches 90. When the frame 14 is in its collapsed position along with cover 16, the top 18 is secured to base 16 so as to present a convenient housing for the frame and cover. This condition is illustrated in FIG. 7 where it will be seen that the edge 89 of top sidewall 88 is in closing relationship with upper margin 28 of base sidewall 26; the clips 90 releasably hold the top 18 to the base 12 to define the housing. A carry strap 92 may be attached to sidewall 26 as shown for ease of transport.

When the carrier 10 is to be used, the latches 90 are actuated, permitting separation of the top 18 from base 12. This immediately results in pop-up self-erection of the frame 14 and cover 16, owing to the fact that the frame restraint provided by the top 18 is released. Next, the top is inverted (FIG. 3) and the underside 20b of the base 12 is fitted into the concavity presented by the inverted top. Specifically, the base is positioned within the inverted top so that the terminal edge 89 interfits with the lower lip edge 29 of sidewall 26. Here again, the latches 90 are used to interconnect the inverted top 18 with base 12 so that the combined structure assumes the configuration depicted in FIGS. 1 and 2. The doorway 66 can then be opened along with the window flaps as desired, in order to accommodate a pet.

When it is desired to collapse the frame and cover, it is only necessary to place top 18 above the latter (FIG. 5) and press downwardly to move the top 18 towards base 12. This causes the frame 14 to progressively move toward the collapsed position thereof under the influence of the restraint presented by the top 18. Ultimately, the top 18 is pressed into mating relationship with the base 12, and the latches 90 are used to reattach the base and top.

Although not shown, if desired the bottom panel 20 of base 12 may be slightly sloped for drainage, and a drain aperture may be provided. Thus, during long term use of the carrier, animal waste may flow through the aperture and be retained within the inverted top 18. The preferred synthetic resin material making up the base and top allow easy cleanup after such use.

What is claimed is:

1. A collapsible pet carrier, comprising:
   a base;
   a frame secured to said base and selectably shiftable between a collapsed position proximal to the base and an extended use position;
   a flexible cover adapted to be disposed over said frame in the extended position thereof,
   said frame movable from the collapsed to the extended position thereof without manual manipulation of the frame; and
   a top engageable with said base to cooperatively form a housing, said frame in the collapsed position thereof and said cover being situated within said housing, said top serving to maintain said frame in said collapsed position.

2. The pet carrier of claim 1, said frame formed of elongated, resilient shape memory material.

3. The pet carrier of claim 2, said material comprising a resilient metal or synthetic resin having shape memory capacity.

4. The pet carrier of claim 3, said material comprising music wire.

5. The pet carrier of claim 2, said frame formed of a unitary, endless length of said material.

6. The pet carrier of claim 1, said frame secured to said base.

7. The pet carrier of claim 1, said flexible cover formed from a fabric material.

8. The pet carrier of claim 7, said fabric material selected from the group consisting of synthetic resin, fabrics, and canvas.

9. The pet carrier of claim 1, said cover secured to said base.

10. The pet carrier of claim 9, said cover including an elongated attachment rod secured to the lower end thereof, said rod engagable by couplers affixed to said base.

11. The pet carrier of claim 1, said cover presenting at least one window opening therethrough, said window opening covered by a generally transparent material permitting visual observation of the interior of the carrier.

12. The pet carrier of claim 11, said generally transparent material comprising a mesh material.

13. The pet carrier of claim 11, including a non-transparent segment secured to said cover and operable to selectively cover said window opening.

14. The pet carrier of claim 1, including an access door formed in said cover and selectively openable to permit ingress and egress of an animal into and out of said carrier.

15. The pet carrier of claim 1, said base formed of substantially rigid synthetic material.

16. The pet carrier of claim 1, said base including an underside opposite said frame, said top being configured for attachment to said base underside when the top is disengaged with the base.

17. The pet carrier of claim 16, including coupling structure for connecting said base underside and said top.

18. A collapsible pet carrier comprising:
   a base presenting an upper margin and an underside beneath the upper margin;
   a frame secured to said base and shiftable between a collapsed position proximal to the base and an extended use position;
   a flexible cover adapted to be disposed over said frame in the extended position thereof; and
   a top configured for attachment to the upper margin of said base in order to cooperatively define a housing for said frame when the frame is in the collapsed position thereof,
   said top being selectively detachable from said base upper margin to permit extension of said frame,
   said top also configured for attachment to said base underside when the frame is in the extended position thereof.

19. The pet carrier of claim 18, said frame formed of elongated, resilient shape memory material.

20. The pet carrier of claim 19, said material comprising a resilient metal or synthetic resin having shape memory capacity.

21. The pet carrier of claim 20, said material comprising music wire.

22. The pet carrier of claim 19, said frame formed of a unitary, endless length of said material.

23. The pet carrier of claim 18, said flexible cover formed from a fabric material.

24. The pet carrier of claim 23, said fabric material selected from the group consisting of synthetic resin, fabrics, and canvas.

25. The pet carrier of claim 18, said cover secured to said base.

26. The pet carrier of claim 25, said cover including an elongated attachment rod secured to the lower end thereof, said rod engagable by couplers affixed to said base.

27. The pet carrier of claim 18, said cover presenting at least one window opening therethrough, said window opening covered by a generally transparent material permitting visual observation of the interior of the carrier.

28. The pet carrier of claim 27, said generally transparent material comprising a mesh material.

29. The pet carrier of claim 28, including a non-transparent segment secured to said cover and operable to selectively cover said window opening.

30. The pet carrier of claim 18, including an access door formed in said cover and selectively openable to permit ingress and egress of an animal into and out of said carrier.

31. The pet carrier of claim 18, said base formed of substantially rigid synthetic material.

32. The pet carrier of claim 18, said top formed of substantially rigid synthetic material.

33. The pet carrier of claim 18, including coupling structure for connecting said base underside and said top.

34. A collapsible pet carrier comprising:
   a base;
   a frame secured to said base and shiftable between a collapsed position and an extended use position;
   a flexible cover disposed over said frame and adapted to form an enclosure when the frame is in the extended position; and
   a top releasably attached to said base to cooperatively define a housing containing therein said frame and cover,
   said frame being restrained in said collapsed position by virtue of the presence of said top,
   said frame being extendable without manual manipulation upon removal of said top to thereby relieve the restraint on the frame.

35. The carrier of claim 34, said frame shiftable from the extended position thereof to said collapsed position by pressing of said top against the extended frame and toward the base.

36. The pet carrier of claim 34, said frame formed of elongated, resilient shape memory material.

37. The pet carrier of claim 36, said material comprising a resilient metal or synthetic resin having shape memory capacity.

38. The pet carrier of claim 37, said material comprising music wire.

39. The pet carrier of claim 36, said frame formed of a unitary, endless length of said material.

40. The pet carrier of claim 34, said flexible cover formed from a fabric material.

41. The pet carrier of claim 39, said fabric material selected from the group consisting of synthetic resin, fabrics, and canvas.

42. The pet carrier of claim 34, said cover secured to said base.

43. The pet carrier of claim 42, said cover including an elongated attachment rod secured to the lower end thereof, said rod engagable by couplers affixed to said base.

44. The pet carrier of claim 34, said cover presenting at least one window opening therethrough, said window opening covered by a generally transparent material permitting visual observation of the interior of the carrier.

45. The pet carrier of claim 44, said generally transparent material comprising a mesh material.

46. The pet carrier of claim 45, including a non-transparent segment secured to said cover and operable to selectively cover said window opening.

47. The pet carrier of claim 34, including an access door formed in said cover and selectively openable to permit ingress and egress of an animal into and out of said carrier.

48. The pet carrier of claim 34, said base formed of substantially rigid synthetic material.

49. The pet carrier of claim 34, said top formed of substantially rigid synthetic material.

50. The pet carrier of claim 34, including coupling structure for connecting said base underside and said top.

51. In a method of erecting a pet carrier, said carrier having a base and a top releasably interconnected to cooperatively define a housing, an extendable frame and a frame cover within the housing, said method comprising the steps of detaching said top from said base, and allowing said frame to move to an extended use position without manual manipulation of the frame by virtue of shape memory characteristics of the frame, whereby the pet carrier is erected.

52. The method of claim 51, further including the step of collapsing the erected pet carrier after use thereof, said collapsing step comprising the step of placing said top above the erected pet carrier, and pressing said top downwardly toward said base, and interconnecting the top to said base.

* * * * *